United States Patent [19]

Sinkovitz et al.

[11] 4,316,943

[45] Feb. 23, 1982

[54] WATER-INSENSITIVE ELECTROCONDUCTIVE ARTICLE COMPRISING A SUBSTRATE COATED WITH POLYMERS OF DIALLYLDIMETHYL-AMMONIUM CHLORIDE AND N-METHYLOLACRYLAMIDE AND METHOD OF COATING

[75] Inventors: Gloria D. Sinkovitz, Bridgeville; Kenneth W. Dixon, Drexel Hill, both of Pa.

[73] Assignee: Calgon Corporation, Pittsburgh, Pa.

[21] Appl. No.: 215,955

[22] Filed: Dec. 12, 1980

Related U.S. Application Data

[60] Continuation of Ser. No. 117,725, Feb. 1, 1980, abandoned, which is a continuation-in-part of Ser. No. 59,418, Jul. 20, 1979, abandoned, which is a division of Ser. No. 968,328, Dec. 11, 1978, abandoned, which is a continuation-in-part of Ser. No. 864,347, Dec. 27, 1977.

[51] Int. Cl.[3] ...................... B32B 27/06; C08F 34/00

[52] U.S. Cl. ................................ 428/475.8; 428/483; 428/514; 428/913; 427/121; 427/74; 427/391; 427/162; 430/70; 430/73; 430/74; 430/62; 162/138; 526/295; 428/511; 428/516

[58] Field of Search ............. 428/479.6, 480, 483,510, 428/537, 514, 913, 526, 475.8, 511, 516; 427/121, 74, 391, 162; 430/70, 73, 74, 62; 162/138; 526/295

[56] References Cited

U.S. PATENT DOCUMENTS

| | | | |
|---|---|---|---|
| Re. 28,543 | 9/1975 | Boothe et al. | 428/514 |
| 3,991,256 | 11/1976 | Cormer et al. | 428/514 |

*Primary Examiner*—P. Ives

*Attorney, Agent, or Firm*—Mario A. Monaco; Martin L. Katz; R. Brent Olson

[57] ABSTRACT

Electroductive article comprising a coating composition of copolymers containing from 70 percent to 85 percent by weight diallyldimethylammonium chloride and at least 15 percent but less than 30 percent by weight N-methylolacrylamide and optional comonomers is disclosed. These electroconductive polymers are coated onto a substrate and become water-insensitive thereafter.

13 Claims, No Drawings

WATER-INSENSITIVE ELECTROCONDUCTIVE ARTICLE COMPRISING A SUBSTRATE COATED WITH POLYMERS OF DIALLYLDIMETHYL-AMMONIUM CHLORIDE AND N-METHYLOLACRYLAMIDE AND METHOD OF COATING

This is a continuation of application Ser. No. 117,725, filed Feb. 1, 1980, now abandoned; which is a continuation-in-part of application Ser. No. 059,418, filed July 20, 1979, now abandoned; which is a division of application Ser. No. 968,328, filed Dec. 11, 1978, now abandoned; which is a continuation-in-part of application Ser. No. 864,347, filed Dec. 27, 1977, now abandoned.

BACKGROUND OF THE INVENTION

This invention relates to electroconductive polymers, electroconductive materials and processes for preparing electroconductive paper.

Electroconductive paper may be used for a variety of purposes. Nonimpact printing processes such as electrostatographic, electrophotographic, electrographic, "Electrofax" and other processes call for the placement of an electric charge on the paper. In electrophotography, the paper contains a photo-responsive or photoconductive layer of material, such as a specially treated zinc oxide which causes the charge to be dissipated in an area where light strikes it, thus leaving a pattern of the charged areas which is a reproduction of the image desired. The charged area attracts a powdered or other usually particulated image-forming material which may be fused or otherwise treated to make the image permanent. In electrography, electrostatics are used without radiation. The electrical charge is deposited only in the imaged areas. The common characteristic of all of these processes is the use of an electrically conductive base paper.

Similarly, dielectric paper has a substrate which may be paper or plastic, an electroconductive coating and a top dielectric coating which will accept and hold an electrical charge until the paper is contacted with toner.

In the present methods of preparing dielectric and other forms of electroconductive paper, the substrates are coated with an aqueous conductive coating formulation and topcoated with solvent based dielectric or photoconductive, i.e. zinc oxide formulations. This method has many disadvantages, such as the high cost of energy related materials associated with solvent coatings, the increased fire hazards of organic solvents, the high cost of solvent recovery systems and slower coating speeds which are characteristic of solvent based coating systems.

The use of an aqueous topcoat in conjunction with an aqueous conductive coating is impractical when the topcoat is applied directly on the conductive layer. Migration of the conductive species occurs during the topcoating causing a breakdown of the aqueous dielectric emulsion and/or poisoning of the dielectric topcoat.

SUMMARY OF THE INVENTION

This invention is directed to an electroconductive coating formulation which overcomes the aforementioned disadvantages of solvent based coating systems. This formulation comprises an electroconductive polymer which, although applied from an aqueous slurry, becomes water-insensitive upon drying, thereby permitting the use of an aqueous based dielectric topcoat without migration of the conductive species into the dielectric layer.

The electroconductive polymer useful in the formulation of this invention is a copolymer containing from 70 percent to about 85 percent by weight diallyldimethylammonium chloride and at least about 15 but less than 30 weight percent N-methylolacrylamide and, if desirable, one or more comonomers selected from the group consisting of monomers of the formula:

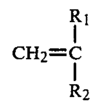

where $R_1$ represents a member of the class consisting of hydrogen, halogen, $R_2$ and alkyl groups of one to four carbon atoms; and $R_2$ represents a radical of the class consisting of aryl and alkaryl radicals and radicals represented by the formulas:

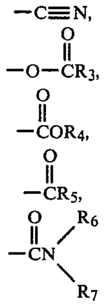

or $-OR_8$ where $R_3$ and $R_4$ each represent a radical selected from the class consisting of alkyl, cycloalkyl and alkoxyalkyl radicals;

$R_5$ has the same meaning as $R_3$ and $R_4$ and, in addition, an aryl radical;

$R_6$ and $R_7$ each represent a member of the class consisting of hydrogen and alkyl, cycloalkyl, aryl, alkaryl, aralkyl and akloxyalkyl radicals; and $R_8$ has the same meaning as $R_3$ and $R_4$.

Other suitable comonomers include diallylamine monomers of the formula:

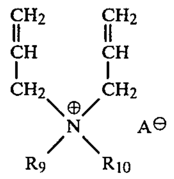

where $R_9$ and $R_{10}$ each represent a radical selected from the class consisting of hydrogen, alkyl of one to eighteen carbon atoms; and $A^-$ is an anion, such as fluoride, chloride, bromide, hydroxide, nitrate, acetate, $HSO_4^-$ and $H_2PO_4^-$.

The polymers of this invention have a molecular weight of at least 10,000 and preferably at least 50,000.

The copolymers of diallyldimethylammonium chloride, N-methylolacrylamide and the optional comonomers may be prepared by conventional solution polymerization techniques, as for example, those described in U.S. Pat. No. 2,923,701 or U.S. Pat. No. 3,288,770.

Although the copolymers described in these patents may be sufficiently crosslinked under any pH conditions, basic pH's are preferred. Acidic pH curing leads to a breakdown of the aqueous dielectric emulsion when applied.

The crosslinking agent used in the preparation of these copolymers is preferably ammonia, but other amines and acid-containing compounds may be used. A number of catalysts for crosslinking for N-methylolacrylamide have been described in the literature.

The copolymers of diallyldimethylammonium chloride and N-methylolacrylamide are formulated in an aqueous system which contains the polymer, a crosslinking agent, water and, if desired, a binder and a pigment. The polymers of this invention will generally be employed in amounts ranging from about 0.1 to 4.0 pounds per 3000 square feet of material to be coated. Substrates, such as paper, and synthetic substrates, as for example, MYLAR (polyethylene glycol terephthalate), nylon and polyethylene, may be coated by the polymers of this invention. Conventional coating techniques may be used.

Dielectric resins may be used alone but they usually are mixed with pigments, such as barium sulfate, zinc sulfide, calcined clay, zinc oxide and other additives to insure good runability. Suitable aqueous-based dielectric resins include styrene/methyl methacrylate, vinyl acetate/methyl methacrylate, vinyl acetate/crotonic acid and styrene/butadiene copolymers.

The following examples illustrate the preparation and utility of the polymers of this invention.

EXAMPLE 1

Diallyldimethylammonium chloride (320.5 grams of a 67.4% aqueous solution), ethylenediaminetetraacetic acid (0.3 grams), isopropanol (4.0 grams) and deionized water (159.8 grams) are charged to a kettle with agitation. The pH is adjusted to 7.0 to 7.5 with dilute hydrochloric acid and the system purged with nitrogen for one hour while heating to 100° C. A solution of ammonium persulfate (21.3%, 12.7 grams, 11.7 ml) and a solution of sodium carbonate (19.3%, 12.7 grams, 10.6 ml) are added to the mixture at rates of 0.0647 ml/minute, respectively, for three hours, while N-methylolacrylamide (60.0%, 90 grams, 81.8 ml) is metered at the rate of 1.49 ml/minute for the first 30 minutes, 0.68 ml/minute for the next 30 minutes, 0.40 ml/minute for the following 30 minutes and 0.07 ml/minute for the last 60 minutes. During the additions, reflux is maintained and a slow stream of nitrogen is bubbled over the surface. Reflux is maintained for one hour after the additions are complete and additional deionized water (75.0 grams) is added and the reaction mixture cooled to ambient temperature. The pH is then adjusted to 7.0 to 7.5 with dilute sodium hydroxide and the reaction mixture discharged.

EXAMPLE 2

A typical conductive polymer formulation would contain 25% conductive polymer, 20% binder, 50% pigment and 5% of a suitable crosslinking agent. The pigment is generally prepared in a 65% active solids slurry. The required amount of crosslinking agent is solubilized in a portion of the dilution water. The final coating preparation is prepared by adding, in the following order, clay (134.6 grams), electroconductive polymer (109.3 grams of 40% solution), dilution water (120 grams), binder (67.3 grams of 52% active terpolymer of ethylene, vinyl acetate and N-methylolacrylamide) and crosslinking agent (8.8 grams of $NH_4Cl$ in 60 grams of water). The pigmented formulation is adjusted to pH 8 with $NH_4OH$. The coating should be smooth and free of grit formation.

EXAMPLE 3

Barrier-coated paper is manually coated with the formulation described above. The coated sheets are dried for 15 seconds on a Print Dryer and for 15 minutes in a 135° C. forced air oven. The coated sheets are conditioned overnight at 50% RH and 72° F. after which they are weighed to obtain coatweight, then evaluated for conductivity.

Circles of 3.375 inches diameter are cut from the conditioned coated sheets. Surface resistivity (1/conductivity) is measured by using a Keithley Resistivity Adapter and Keithley Electrometer. The test specimens are placed in the adapter, coated side down. A direct current of 100 volts is applied across the surface and the resistivity (measured in amperes) is read directly from the electrometer. The surface resistivity in ohms/unit of area is calculated using the following equation:

$$\text{Surface Resistivity (ohms/square) (S.R.)} = \frac{\text{applied voltage}}{\text{electrometer reading in amperes}}$$

Test specimens are then subjected to a water soak test in which the test specimens are immersed for 15 seconds in a 1000 ml beaker which contains 900 ml of mildly agitated water. The test specimens are then dried for 10 minutes at 110° C. in an oven and reconditioned at 50% RH and 72° F. overnight. The test specimens are then lightly calendered at about 500 psi and the surface resistivity again measured. The difference in the two readings, before and after the soak test, indicates the level of water resistance. In this regard, smaller differences are indicative of greater degrees of water resistance.

Table 1 sets forth comparisons between a number of sheets coated with copolymers of diallyldimethylammonium chloride/N-methylolacrylamide.

TABLE I

| Sheet No. | Polymer Comp. % by Weight | Coat-weight #/3000 ft.$^2$ | SR (Ohms, Square) 50% RH Before | After | Approx. Loss In Conductivity (In Decades) |
|---|---|---|---|---|---|
| 1 | 90/10 | .27 | $7.6 \times 10^7$ | $1.9 \times 10^{11}$ | 3.4 |
| 2 | 90/10 | .19 | $8.5 \times 10^7$ | $2.0 \times 10^{11}$ | 3.4 |
| 3 | 90/10 | .25 | $1.1 \times 10^8$ | $8.0 \times 10^9$ | 1.7 |
| 4 | 90/10 | .31 | $1.1 \times 10^8$ | $1.6 \times 10^{11}$ | 3.0 |
| 5 | 90/10 | .18 | $8.6 \times 10^7$ | $3.8 \times 10^9$ | 1.5 |
| 6 | 90/10 | .19 | $7.0 \times 10^7$ | $1.4 \times 10^{11}$ | 3.4 |
| 7 | 90/10 | .23 | $6.3 \times 10^7$ | $1.8 \times 10^9$ | 1.6 |
| 8 | 80/20 | .21 | $1.8 \times 10^8$ | $8.0 \times 10^8$ | 0.6 |
| 9 | 90/10 | .18 | $9.5 \times 10^7$ | $4.5 \times 10^{10}$ | 2.5 |
| 10 | 90/10 | .16 | $1.1 \times 10^8$ | $3.1 \times 10^9$ | 1.2 |

EXAMPLE 4

Several copolymers of 80 weight percent diallyldimethylammonium chloride and 20 weight percent N-methylolacrylamide having a range in viscosity were prepared in accordance with the procedure of Example 3. The results of these tests are set forth below in Table II.

TABLE II

| Sample No. | Brookfield Viscosity (cps) | Coatweight #/3000 ft.$^2$ | SR (Ohms, Square) 50% RH Before | After | Approx. Loss In Conductivity (In Decades) |
|---|---|---|---|---|---|
| 1 | 4110 | .79 | $1.4 \times 10^8$ | $9.4 \times 10^8$ | 0.8 |
| | | 1.30 | $4.1 \times 10^7$ | $1.5 \times 10^8$ | 0.8 |
| 2 | 1358 | .72 | $2.1 \times 10^8$ | $1.4 \times 10^9$ | 0.7 |
| | | 1.20 | $5.8 \times 10^7$ | $1.8 \times 10^8$ | 0.7 |
| 3 | 682 | .60 | $3.6 \times 10^8$ | $4.9 \times 10^9$ | 1.1 |
| | | 1.00 | $4.5 \times 10^7$ | $1.6 \times 10^8$ | 0.7 |
| 4 | 2920 | .47 | $3.1 \times 10^8$ | $1.3 \times 10^9$ | 0.6 |
| | | .98 | $5.7 \times 10^7$ | $1.3 \times 10^8$ | 0.6 |
| 5 | 2088 | .43 | $2.2 \times 10^8$ | $1.3 \times 10^9$ | 0.9 |
| | | .90 | $1.0 \times 10^8$ | $2.5 \times 10^8$ | 0.2 |

EXAMPLE 5

Several copolymers of diallyldimethylammonium chloride and N-methylolacrylamide having varying amounts of the two monomers were prepared in accordance with the procedures of Example 1 and evaluated in accordance with procedures of Example 3. Table III shows that while substantial losses in conductivity occur in the 90/10 diallyldimethylammonium chloride/N-methylolacrylamide (DMDAAC/N-MAM) coated sheet, those sheets coated with the copolymers of this invention exhibited much less conductivity loss.

TABLE III

| Sheet No. | DMDAAC/N-MAM Composition | Coatweight #/3000 ft.$^2$ | SR (Ohms, Square) 50% RH Before | After | Approx. Loss In Conductivity (In Decades) |
|---|---|---|---|---|---|
| A-1 | 90/10 | .34 | $4.5 \times 10^7$ | $6.3 \times 10^{10}$ | 3.2 |
| 2 | | .49 | $2.5 \times 10^7$ | $4.5 \times 10^{10}$ | 3.2 |
| B-1 | 85/15 | .44 | $3.8 \times 10^7$ | $6.1 \times 10^8$ | 1.2 |
| 2 | | .62 | $2.7 \times 10^7$ | $8.5 \times 10^7$ | 0.6 |
| C-1 | 80/20 | .30 | $6.9 \times 10^7$ | $1.2 \times 10^9$ | 1.4 |
| 2 | | .46 | $4.5 \times 10^7$ | $1.8 \times 10^8$ | 0.7 |
| D-1 | 75/25 | .35 | $7.1 \times 10^7$ | $2.3 \times 10^8$ | 0.5 |
| 2 | | .54 | $4.9 \times 10^7$ | $1.7 \times 10^8$ | 0.7 |
| E-1 | 70/30 | .33 | $1.5 \times 10^8$ | $7.9 \times 10^8$ | 0.6 |
| 2 | | .46 | $8.8 \times 10^7$ | $2.4 \times 10^8$ | 0.4 |

EXAMPLE 6

Diallyldimethylammonium chloride (320.5 grams of a 67.4% aqueous solution), diallylamine (9.8 grams), ethylenediaminetetraacetic acid (0.3 grams), isopropanol (4.0 grams) and deionized water (162.5 grams) are charged to a kettle with agitation. The pH should be adjusted to 2.0 with concentrated hydrochloric acid and the system purged with nitrogen for one hour while heating to reflux. A solution of ammonium persulfate (21.3%, 12.7 grams) and a solution of sodium carbonate (19.3%, 12.7 grams) is added to the mixture at rates of 0.0647 and 0.0588 ml/minute, respectively, for three hours while N-methylolacrylamide (60.0% aqueous, 67.5 grams) is metered at the rate of 1.15 ml/minute for the first 30 minutes, 0.521 ml/minute for the next 30 minutes, 0.312 ml/minute for the following 30 minutes and 0.0521 ml/minute for the last 60 minutes. During the additions, reflux is maintained and a slow stream of nitrogen is passed over the surface. Reflux is maintained for one hour after the additions are complete and additional deionized water (75.0 grams) is added and the reaction mixture cooled to ambient temperature. The pH is then adjusted to 7.0 to 7.5 with dilute sodium hydroxide and the reaction mixture discharged.

EXAMPLE 7

Diallyldimethylammonium chloride (320.5 grams of a 67.4% aqueous solution), ethylenediaminetetra-acetic acid (0.3 grams), isopropanol (4.0 grams) and deionized water (162.5 grams) are charged to a kettle with agitation. The pH is adjusted to 7.0 to 7.5 with dilute hydrochloric acid and the system purged with nitrogen for one hour while heating to reflux. A solution of ammonium persulfate (21.3%, 12.7 grams) and a solution of sodium carbonate (12.3%, 12.7 grams) is added to the mixture at rates of 0.0647 and 0.0588 ml/minute, respectively, for three hours while N-methylolacrylamide (60.0% aqueous, 67.5 grams) is metered at the rate of 1.15 ml/minute for the first 30 minutes, 0.521 ml/minute for the next 30 minutes, 0.312 ml/minute for the following 30 minutes and 0.0521 ml/minute for the last 60 minutes. Simultaneously, acrylonitrile (13.5 grams) is fed in over 150 minutes. Reflux is maintained for one hour after the additions are complete. Additional deionized water (75.0 grams) is added and the reaction mixture cooled to ambient temperature. The pH is then adjusted to 7.0 to 7.5 with dilute sodium hydroxide and the reaction mixture discharged.

EXAMPLE 8

The procedure of Example 7 is followed except the acrylonitrile is replaced by 13.5 grams of vinyl acetate to produce the corresponding polymer of diallyldimethylammonium chloride, N-methylolacrylamide and vinyl acetate.

EXAMPLE 9

The procedure of Example 7 is followed except the acrylonitrile is replaced by 13.5 grams of ethyl acrylate to produce the corresponding polymer of diallyldimethylammonium chloride, N-methylolacrylamide and ethyl acrylate.

EXAMPLE 10

The procedure of Example 7 is followed except the acrylonitrile is replaced by methyl vinyl ketone to produce the corresponding polymer of diallyldimethylammonium chloride, N-methylolacrylamide and methyl vinyl ketone.

EXAMPLE 11

The procedure of Example 7 is followed except the acrylonitrile is replaced by acrylamide (50.0%, 27.0 grams) to produce the corresponding polymer of diallyldimethylammonium chloride, N-methylolacrylamide and acrylamide.

EXAMPLE 12

The procedure of Example 7 is followed except the acrylonitrile is replaced by ethyl vinyl ether (13.5 grams) to produce the corresponding polymer of diallyldimethylammonium chloride, N-methylolacrylamide and ethyl vinyl ether.

EXAMPLE 13

Mylar sheets were coated with an 80/20 copolymer of diallyldimethylammonium chloride and N-methylolacrylamide and evaluated for surface resistivity and charge acceptance for the procedure of Example 3. The results of these tests are set forth in Table IV.

TABLE IV

| Coating | Coatweight (lbs./3000 ft.$^2$) | Charge Acceptance (v.) | Surface Resistivity | |
|---|---|---|---|---|
| | | | 20% R.H. | 50% R.H. |
| None | 0 | >1000 | $>10^{14}$ | $>10^{14}$ |
| 80/20[1] | 0.3 | 0 | $3.6 \times 10^{10}$ | $1.6 \times 10^{8}$ |
| 80/20[2] | indeterminate[3] | >1000 | $>10^{14}$ | $>10^{14}$ |

[1]Dilution to 5% solids with methanol
[2]Dilution to 5% solids with water
[3]Coating was discontinuous on the surface of the mylar sheet, with numerous "craters". A valid coatweight for specimens for the charge acceptance and resisitivity measurements could not be taken.

We claim:

1. An electroconductive article which comprises a substrate and a layer of a coating composition which contains a crosslinked water-insensitive copolymer containing at least 15, but less than 30, percent by weight N-methylolacrylamide and from 70 to 85 percent by weight diallyldimethylammonium chloride.

2. An electroconductive article as in claim 1 wherein the substrate is paper.

3. An electroconductive article as in claim 1 wherein the substrate is selected from the group consisting of polyethylene glycol terephthalate, nylon and polyethylene.

4. An electroconductive article as in claim 1 wherein the copolymer is present in a concentration of at least 0.1 pound per 3000 square feet of substrate.

5. An electroconductive article as in claim 1 wherein the polymer-containing layer also contains a binder.

6. An electroconductive article as in claim 5 wherein the polymer-containing layer also contains a pigment.

7. An electroconductive article as in claim 1 wherein the article also contains a dielectric layer.

8. An electroconductive article as in claim 1 wherein the article also contains a photoconductive layer.

9. A method of making an electroconductive article which comprises coating a substrate with at least 0.1 pound per 3000 square feet of a copolymer which contains at least 15, but less than 30, percent by weight N-methylolacrylamide and from 70 to 85 percent by weight diallyldimethylammonium chloride.

10. A method of making an electroconductive article as in claim 9, wherein said substrate is paper.

11. A method of making an electroconductive article as in claim 9, wherein said substrate is selected from the group consisting of polyethylene glycol terephthalate, nylon and polyethylene.

12. An electroconductive article as in claim 1 wherein the copolymer also contains at least one comonomer of the formula:

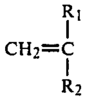

where $R_1$ represents a member of the class consisting of hydrogen, halogen and alkyl groups of one to four carbon atoms; and $R_2$ represents a radical of the class consisting of aryl and alkaryl radicals and radicals represented by the formulae:

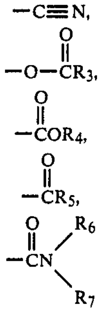

or $-OR_8$ where $R_3$ and $R_4$ each represent a radical selected from the class consisting of alkyl, cycloalkyl and alkoxyalkyl radicals;

$R_5$ has the same meaning as $R_3$ and $R_4$ and, in addition, an aryl radical;

$R_6$ and $R_7$ each represent a member of the class consisting of hydrogen and alkyl, cycloalkyl, aryl, alkaryl, aralkyl and alkoxyalkyl radicals; and $R_8$ has the same meaning as $R_3$ and $R_4$.

13. A method as in claim 9 wherein the copolymer also contains at least one comonomer of the formula:

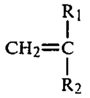

where $R_1$ represents a member of the class consisting of hydrogen, halogen and alkyl groups of one to four carbon atoms; and $R_2$ represents a radical of the class consisting of aryl and alkaryl radicals and radicals represented by the formulae:

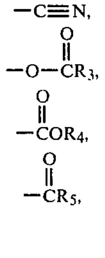

-continued

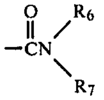

or $-OR_8$ where $R_3$ and $R_4$ each represent a radical selected from the class consisting of alkyl, cycloalkyl and alkoxyalkyl radicals;

$R_5$ has the same meaning as $R_3$ and $R_4$ and, in addition, an aryl radical;

$R_6$ and $R_7$ each represent a member of the class consisting of hydrogen and alkyl, cycloalkyl, aryl, alkaryl, aralkyl and alkoxyalkyl radicals; and $R_8$ has the same meaning as $R_3$ and $R_4$.

* * * * *